United States Patent [19]
Gluys et al.

[11] Patent Number: 5,738,196
[45] Date of Patent: Apr. 14, 1998

[54] PIN-TYPE SYNCHRONIZER

[75] Inventors: James D. Gluys, Portage; Timothy S. Smith, Kalamazoo, both of Mich.

[73] Assignee: Eaton Corporation, Cleveland, Ohio

[21] Appl. No.: 714,731

[22] Filed: Sep. 16, 1996

[51] Int. Cl.$^6$ .................................................. F16D 23/06
[52] U.S. Cl. ............................ 192/53.331; 192/53.33
[58] Field of Search ........................ 192/53.31, 53.33, 192/53.331, 53.332, 48.91; 74/339

[56] References Cited

U.S. PATENT DOCUMENTS

| | | |
|---|---|---|
| 2,993,579 | 7/1961 | Altmann ........................ 192/53.31 X |
| 5,078,244 | 1/1992 | Olson . |
| 5,092,439 | 3/1992 | Reynolds . |
| 5,339,936 | 8/1994 | Lauer . |
| 5,544,727 | 8/1996 | Braun ........................... 192/48.91 |

*Primary Examiner*—Rodney H. Bonck
*Attorney, Agent, or Firm*—Paul S. Rulon; Howard D. Gordon

[57] ABSTRACT

A pin-type, double-acting synchronizer mechanism (10) with friction rings (26, 46 and 28, 48), jaw members (30, 38 and 32, 40) axially secured together by retainers (44), three circumferentially spaced pins (50) including blocker shoulders for preventing asynchronous engagement of the jaw clutches, and pre-energizer assemblies (52) to ensure initial engagement of the friction rings and blocker shoulders in response to initial engaging movement of a shift flange (42), and self-energizing ramps (20a–20d and 62a–62d). The synchronizer includes improved jaw members and self energizing ramps, an improved shift flange, improved pre-energizers, and improved jaw member retainers.

9 Claims, 3 Drawing Sheets

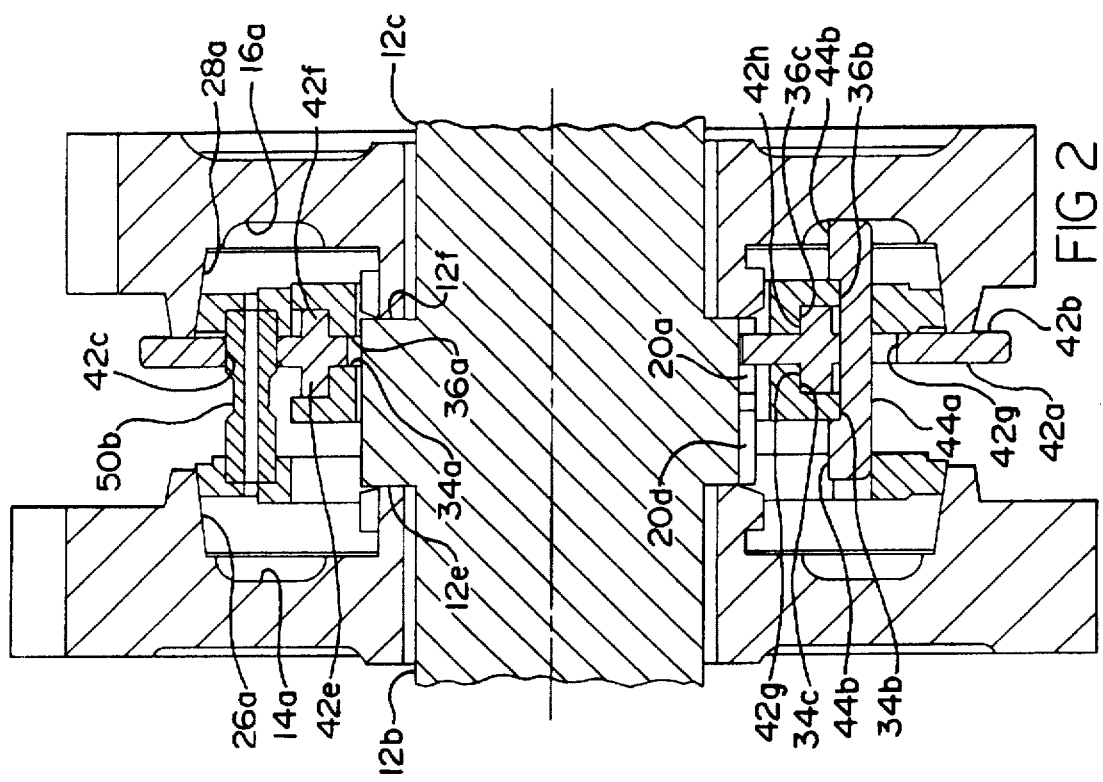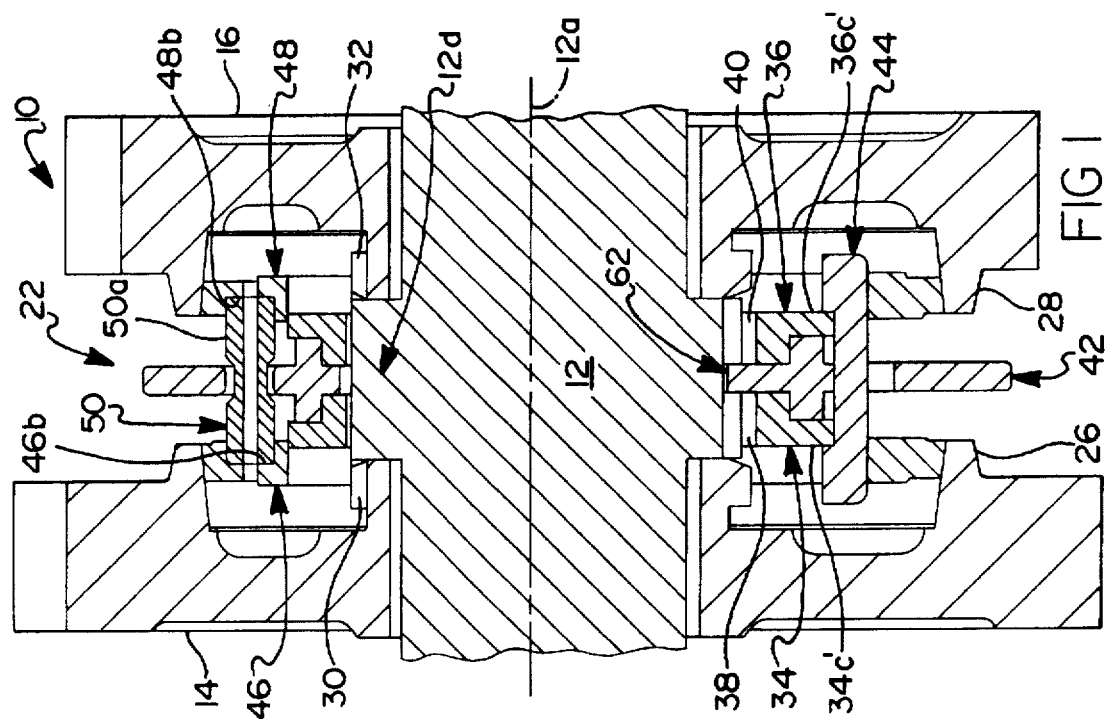

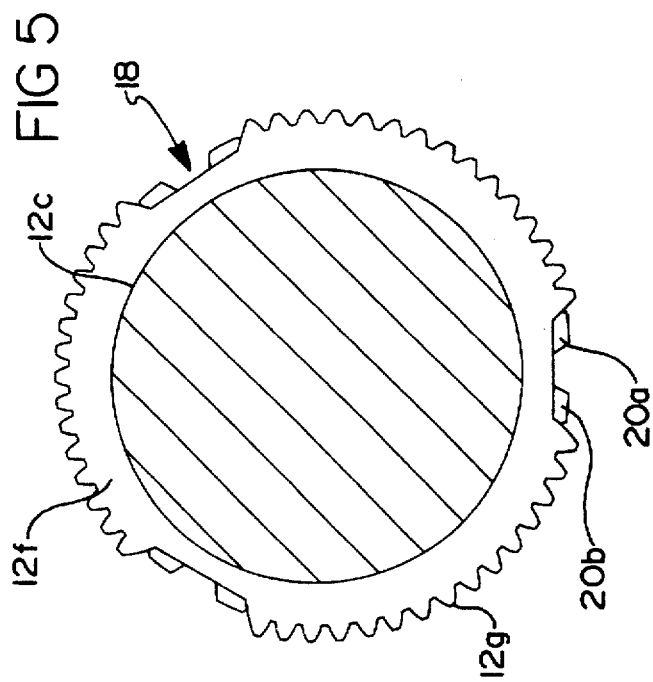
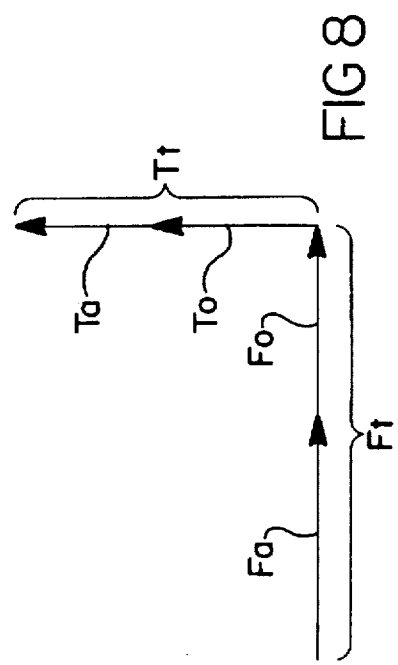
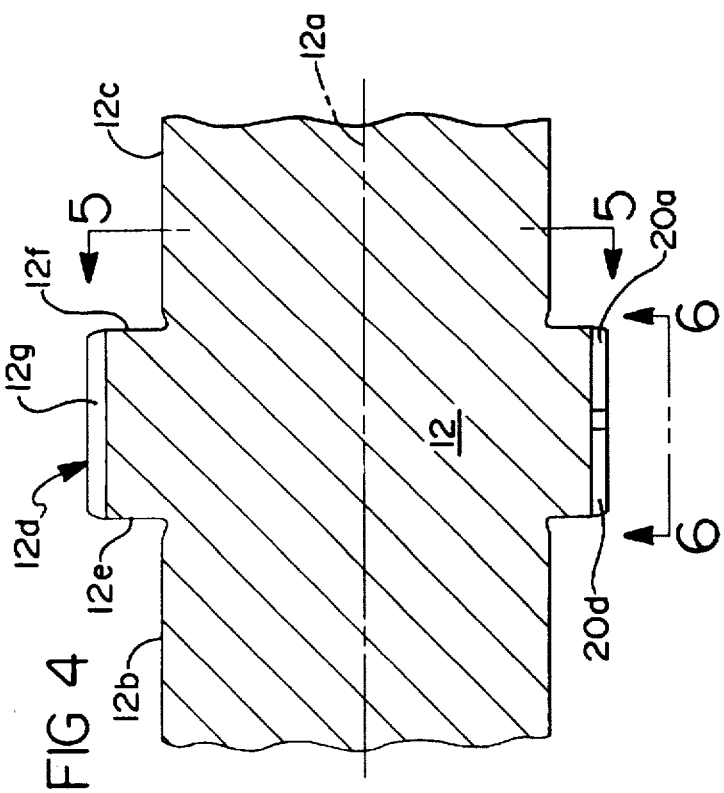
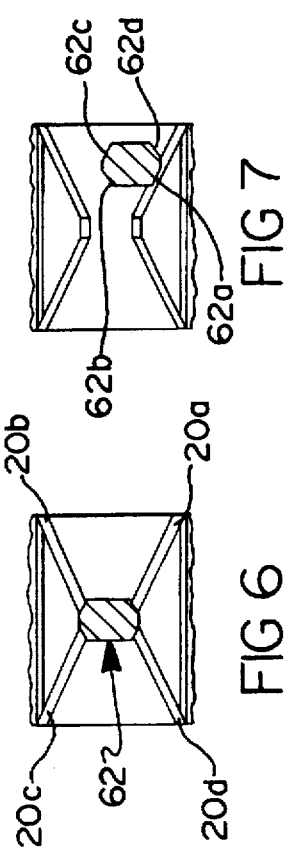
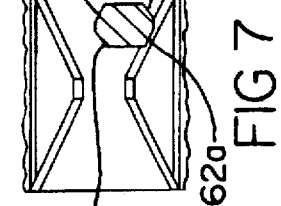

1

PIN-TYPE SYNCHRONIZER

CROSS-REFERENCE TO RELATED APPLICATIONS

This application is related to U.S. application Ser. Nos. 08/714,730; 08/714;731; 08/714,732 and 08/715,262, all filed Sep. 16, 1996. All of these applications are assigned to the assignee of this application.

FIELD OF THE INVENTION

This invention relates to improvements of a pin-type synchronizer for a transmission.

BACKGROUND OF THE INVENTION

It is well known in the multiple speed ratio transmission art that synchronizer mechanisms may be used to reduce shift time of all or some of the transmission gear ratios. It is also known that the shift effort required by a vehicle operator, i.e., force applied to a shift lever, may be reduced by use of synchronizer mechanisms of the self-energizing type. Since operator shift effort generally increases with vehicle size, synchronizer mechanisms of the self-energizing type are especially important for heavy duty trucks. Prior art examples of synchronizers that are relevant to the synchronizer herein may be seen by reference to U.S. Pat. Nos. 5,078,244; 5,092,439 and 5,339,936 which are incorporated herein by reference.

SUMMARY OF THE INVENTION

An object of this invention is to provide pin-type synchronizer with improved axial retainers for the jaw members.

According to the invention, a pin-type synchronizer, includes a pin-type synchronizer selectively operative to frictionally synchronize and positive connect either of first and second drives mounted for relative rotation about an axis of a shaft. The synchronizer includes first and second jaw members affixed respectively to the first and second drives and respectively engagable with axially movable third and fourth jaw members positioned between the drives. The third and fourth jaw members have internal splines slidably mating for non-relative rotation with external splines affixed to the shaft. First and second cone friction rings are respectively secured for rotation with the first and second drives. Third and fourth cone friction rings are concentric to the shaft and axially movable between the drives for frictional engagement respectively with the first and second friction rings to provide a synchronizing torque for synchronizing the drives with the shaft. A radially extending flange has axially oppositely facing sides positioned between the third and fourth jaw members and between the third and fourth friction rings for axially moving the jaw members and rings into said engagement in response to an axial bidirectional shift force ($F_o$) applied to the flange. Blocker means are operative when engaged for preventing engagement of the jaw members prior to the synchronizing. The blocker means including a plurality of circumferentially spaced apart pins rigidly extending axially between the third and fourth friction rings and into a first set of openings in the flange. Each of the pins has a blocker shoulder engagable with a blocker shoulder defined about the associated opening. First means secure the flange against axial movement relative to the third and fourth jaw members.

The improvement is characterized by the first means including a plurality of circumferentially spaced apart

2 retainers. Each retainer has an axially extending portion disposed about a radially outward portion of the third and fourth jaw members and axially spaced apart and radially inwardly extending portions embracing axially oppositely facing portions of the third and fourth jaw members. Each axially extending portion has axially spaced apart and radially outwardly facing portions disposed in relatively close sliding rotation with radially inward portions of the third and fourth friction rings for limiting radially outward movement of the retainers.

BRIEF DESCRIPTION OF THE DRAWINGS

The self-energizing synchronizer mechanism of the invention is shown in the accompanying drawings in which:

FIG. 1 is a sectional view of a somewhat schematically illustrated double-acting synchronizer mechanism in a neutral position;

FIG. 2 is the synchronizer of FIG. 1 engaged rightward;

FIG. 4 is a detailed view of the portion of a shaft in FIG. 1;

FIG. 5 is a sectional view of the shaft in FIG. 5 and looking along line 5—5 of FIG. 4;

FIGS. 6 and 7 are views of a portion of the shaft in FIG. 4 looking along line 6—6 of FIG. 4 and having mating self-energizing ramps of FIG. 3 added thereto; and FIG. 8 is a graphical representation of axial forces and torques acting on a shift flange of the synchronizer;

DETAILED DESCRIPTION OF THE DRAWINGS

Figure 3:
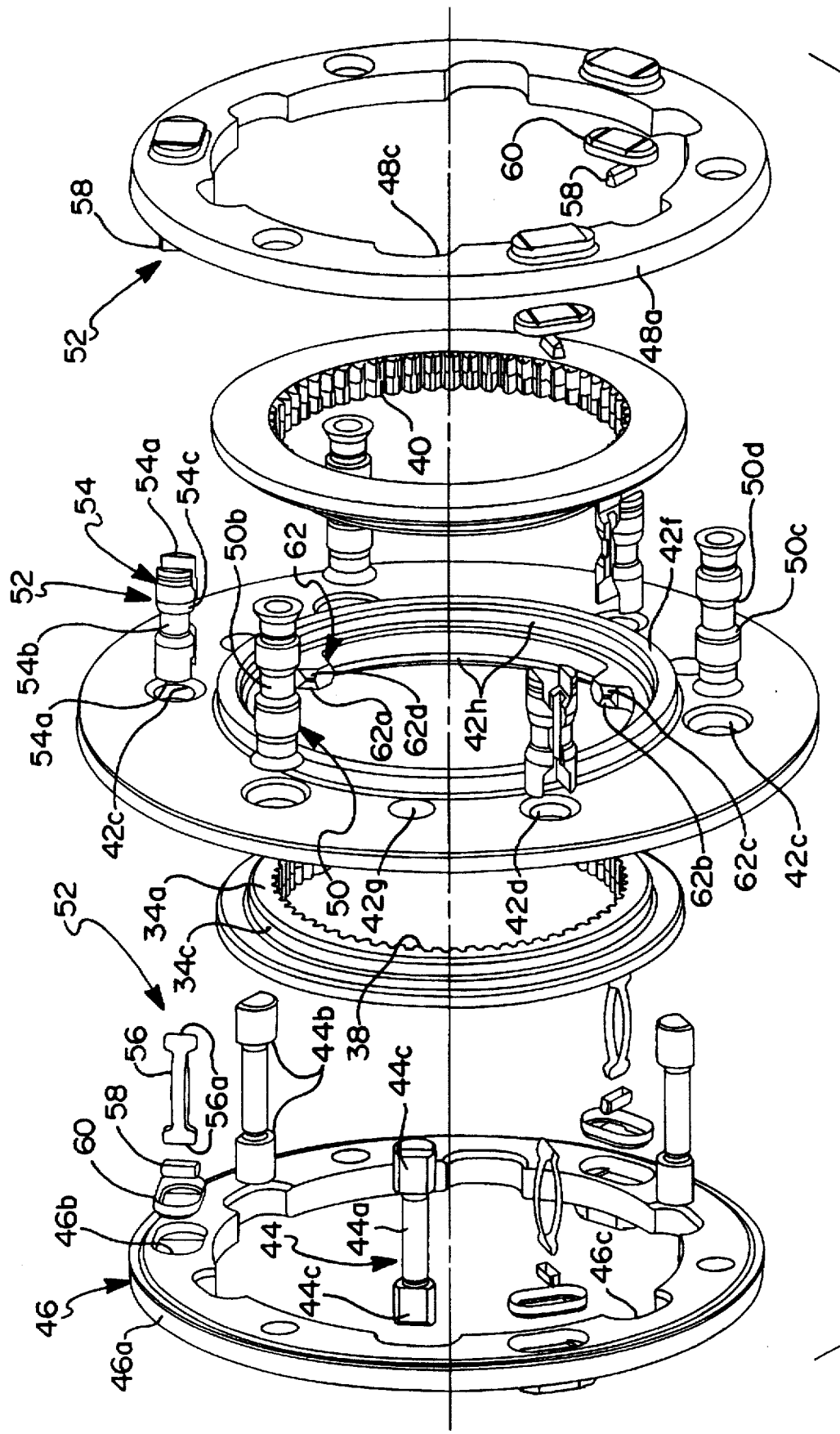
FIG. 3 is a detailed exploded view of parts of the synchronizer in FIG. 1.

The term "synchronizer clutch mechanism", used herein, shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch. The term "self-energizing" shall designate synchronizer clutch mechanism which includes ramps or cams or the like to increase the engaging force of the synchronizing clutch in proportion to the synchronizing torque of the friction clutch.

Looking now at the drawings, therein is shown a gear and synchronizer assembly 10 including a shaft 12 to be mounted for rotation in a transmission about an axis 12a, axially spaced apart drives or gears 14, 16, and a double-acting synchronizer 22.

The shaft 12 includes cylindrical surfaces 12b, 12c rotatably supporting the gears thereon and an annular member 12d having an outer circumference greater in diameter than the diameters of the cylindrical surfaces. The annular member has an axial length separating the gears via axially oppositely facing shoulders 12e, 12f which limit axial movement of the gears toward each other. Axial movement of the gears away from each other is limited in any of several known manners. The annular member may be formed of a ring affixed to the shaft or, as herein, formed integral with the shaft. The outer circumference of the annular member includes external splines 12g formed therein and three recesses 18 of axial length equal to the axial length of the annular member and self-energizing ramps 20a, 20b, 20c, 20d, explained further hereinafter. The recesses totally remove several adjacent splines 12g, thereby simplifying machining of the self-energizing ramps.

The synchronizer mechanism 22 includes friction rings 26, 28 and jaw members 30,32 integrally formed with gears 14,16, jaw members 34,36 having internal spline teeth 38,40 slidably mating with the external spline teeth 12g formed in the outer circumference of annular member 12d, a radially extending shift flange 42 having axially oppositely facing sides 42a, 42b sandwiched between axially facing surfaces 34a, 36a of the jaw members 34, 36, three axially extending retainers 44 for securing the flange and jaw members against relative axial movement, annular friction rings 46, 48 rigidly secured together by three circumferentially spaced apart pins 50 extending axially from each of the friction members and through openings 42c in the flange, and three pre-energizer assemblies 52. Assemblies 52 are shown only in FIG. 3.

The friction rings have cone friction surfaces 26a, 46a and 28a, 48a that engage for frictionally synchronizing the gears to the shaft prior to engagement of the jaw members. Rings 46, 48 include three circumferentially spaced and axially opening recesses 46b, 48b elongated in the circumferential direction, and six circumferentially spaced and radially inwardly opening recesses 46c, 48c extending axially through friction ring 46, 48. The extra recesses 46c, 48c facilitate interchangeability of friction rings 46, 48. As explained further thereinafter, recess 46b, 48b receive ends of the pre-energizer assemblies and recess 46c, 48c receive retainers 44. A wide range of cone angles may be used; cone angles of seven and one-half degrees are employed herein. The friction surfaces 46a, 48a and/or 26a, 28a may be defined by any of several known friction materials affixed to the base member; herein, pyrolyric carbon friction materials, such as disclosed in U.S. Pat. Nos. 4,700,823; 4,844,218; and 4,778,548, are preferred. These patents are incorporated herein by reference.

Pins 50 each include major diameter portions 50a having diameters slightly less than the diameter of flange openings 42c, a reduced diameter or groove portion 50b spaced between friction rings 46, 48 (herein midway), and conical blocker shoulders or surfaces 50c, 50d extending radially outwardly from the pin axis and axially away from each other at angles relative to a plane normal to the pin axis. The grooved portions, when disposed within their respective flange openings, allow limited rotation of the rigid friction ring and pin assembly relative to the flange to effect engagement of the pin blocker shoulders with chamfered blocker shoulders defined about the flange openings 42c. The pins are secured to friction rings 46, 48 in any of several known manners.

The pre-energizer assemblies 52 are of the split pin-type shown and described more completely in previously mentioned U.S. Pat. No. 5,339,936. Each pre-energizer assembly extends axially between the friction rings 46, 48 and through opening 42d which are alternately spaced between opening 42c. Each pre-energizer assembly, shown only in FIG. 3, includes two identical shells 54, at least two identical leaf springs 56 sandwiched between and biasing the shells apart, two retainers 58 which telescope over ends 56a of the springs, and oblong cup-like members 60 disposed in the oblong recesses 46b, 48b in each friction ring 46, 48. The oblong cup-like members 60 and the recesses 46b, 48b are elongated in the circumferential direction of the friction rings and are of sufficient diameter in the radial direction of the friction rings to allow sliding movement of opposite ends 54a of the shells 54. Each pair of shells 54 has a major diameter less than the diameter of its associated opening 42d when squeezed together, semi-annular grooves 54b with chamfered end surface 54c, and the ends 54a. As is known, ends 54a react against friction rings 46, 48 and chamfers 54c react against chamfers about opening 42d in flange 42 in response to initial engaging movement of flange 42. The cup-like members 60 rigidly interface between friction rings 46, 48 and the ends 54a to provide a wear resistant material therebetween. For example the cup-like members may be made of steel and the friction rings may be made of aluminum or some other relatively soft material.

As previously mentioned, jaw members 34, 36 include internal spline teeth 38, 40 slidably mating with external spline teeth 12d affixed to the shaft. The external splines have flank surfaces extending parallel to the shaft axis, and the mating thereof with flank surfaces of the jaw member splines prevents relative rotation therebetween.

Flange 42 further includes annular stiffener rings 42e, 42f extending axially from opposite sides thereof and self-energizing teeth 62 projecting radially inward into the recesses 18 in the outer circumference of shaft annular member 12d. Each tooth 62 includes self-energizing surfaces 62a, 62b, 62c, 62d which cooperate or react against the self-energizing ramp surfaces 20a, 20b, 20c, 20d, respectively. Each stiffener ring includes a radially inwardly facing surface 42h receiving a annular radially outwardly facing surface 34c, 36c of the jaw members 34, 36. The stiffener rings reduce axial distortion of flange 42 during manufacture and while in use. The ramp surfaces allow limited rotation of the flange relative to jaw members 34, 36 and shaft 12, and react synchronizing torque between the cone clutches and shaft to provide an additive axial self-energizing force for increasing the engaging force of the cone clutch initially engaged by a shift force applied to flange 42, thereby increasing the synchronizing torque provided by the cone clutch. The ramp surfaces may be provided for increasing synchronizing force for one or both gears and/or for increasing synchronizing force in response to torque in either direction, as is encountered for up and down shifts.

The retainers 44 each include an axially extending portion 44a disposed about radially outward portions 34b, 36b of jaw members 34, 36 and axially spaced apart and radially inwardly extending portions 44b embracing axially oppositely facing portions 34b', 36b' of jaw members 34, 36. The retainers loosely extend through opening 42g in flange 42 for allowing limited relative rotation therebetween. Each axially extending portion has axially spaced apart and radially outwardly facing portions 44c received in friction ring recesses 46c, 48c and in relatively close sliding relation with radially inwardly facing portions of the recesses. Portions 44c are long enough to remain in sliding relative with the inwardly facing portions of the recesses. Gears 14, 16 include axially extending recesses 14a, 16a for receiving end portions of the retainers when the jaw members are engaged. See FIG. 2. The radially extending sides of recesses 46c, 48c maintain circumferential spacing of the retainers. Ramp surfaces 20a,20b affixed to shaft 12 respectively react against ramp surfaces 62a, 62b on flange teeth 62 to provide additive axial forces to increase or assist the synchronization rate and/or shift quality of gear 16 in response to torque in either direction. Ramp surfaces 20c, 20d respectively react against ramp surfaces 62c, 62d to provide the additive axial forces for gear 14 in response to synchronizing torque in either direction. The angles of the ramp surfaces may be varied to provide different amounts of additive axial force for up and down shifts and for high and low speed ratios. Also, if no additive axial force is preferred in one direction for one gear or more, the ramp surfaces may be parallel to the shaft axis, i.e., no effective ramp surfaces are provided. The magnitude or amount of the axial additive forces, as explained further hereinafter, is also a function of the mean radii ratio of friction clutches and self-energizing ramps. Accordingly, the magnitude of the additive forces for a given shift force applied to shift flange 42 by a shift fork may be varied by varying the ramp angles and/or the mean radii ratio.

When the flange 42 is in the neutral position of FIG. 1, reduced diameter portions 50b of pins 50 are radially aligned with their associated flange openings 42c, friction surfaces of the cone clutches are slightly spaced apart and are maintained in this spaced relation by chamfered or angled pre-energizer surfaces 54c of the pre-energizers 52 acting on pre-energizer chamfered surfaces about flange openings 42d by the force of springs 56. The axial force provided by the pre-energizer surface is preferably sufficient to counter act any additive axial force on flange 42 by the self-energizing ramps due to viscous shear of oil between the cone clutch surfaces. When it is desired to couple either gear to the shaft, an appropriate and unshown shift mechanism, such as disclosed in U.S. Pat. No. 4,920,815 and incorporated herein by reference, is connected to the outer periphery of flange 42 in known manner for moving the flange axially along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever. Whether manually or automatically applied, the force is applied to flange 42 in an axial direction and is represented by the length of arrow $F_o$ in FIG. 8.

Initial rightward axial movement of flange 42 by the operator shift force $F_o$ is transmitted to pins 50 by pre-energizer surfaces 54c to effect initial frictional engagement of cone surface 48a with cone surface 28a. The initial engagement force of the cone surface is of course a function of the force of springs 56 and the angles of the pre-energizer surfaces. The initial frictional engagement (provided an asynchronous condition exists and momentarily ignoring the effect of the self-energizing ramps) produces an initial cone clutch engaging force and synchronizing torque $T_o$ which ensures limited relative rotation between flange 42 and the engaged friction ring, and hence, movement of the reduced diameter pin portions 50b to the appropriate sides of the flange openings 42c to provide engagement of pin blocker shoulders 50d with the blocker shoulders disposed about openings 42c. When the blocker shoulders are engaged, the full operator shift force $F_o$ on flange 42 is transmitted to friction ring 48 via the blocker shoulders, whereby the cone clutch is engaged by the full force of the operator shift force $F_o$ to provide a resultant operator synchronizing torque $T_o$. This operator synchronizing torque $T_o$ is represented by arrow $T_o$ in FIG. 8. Since the blocker shoulders are disposed at angles relative to the axial direction of operator shift force $F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker shoulders move the pins into concentric relation with openings 42c to allow continued axial movement of the flange and engagement of the internal spline/jaw teeth 40 of jaw member 36 with external spline/jaw teeth of jaw member 32, as shown in FIG. 2. The spline/jaw teeth may be configured as shown in U.S. Pat. Nos. 3,265,173 and 4,246,993 which are incorporated herein by reference.

Still ignoring the effects of the self-energizing ramps, cone clutch torque provided by the force $F_o$ is expressed by equation (1).

$$T_o = F_o R_c \mu_c / \sin\alpha \quad (1)$$

where:

$R_c$=the mean radius of the cone friction surface, $\mu_c$=the coefficient of friction of the cone friction surface, and $\alpha$=the angle of the cone friction surfaces.

Looking now at the affects of the self-energizing ramps and referring particularly to FIGS. 6 and 7, the synchronizing torque $T_o$, due to the operator applied axial shift force $F_o$, is of course transmitted to flange 42 by pins 50 and is reacted to shaft 12 across the self-energizing ramp surfaces. The self-energizing ramp surfaces, when engaged, limit rotation of the flange relative to shaft 12 and jaw members 34, 36, and produce an axial force component or axial additive force $F_a$ acting on the flange in the same direction as shift force $F_o$, which forces sum to provide a total force $F_r$ thereby further increasing the engaging force of the cone clutch to provide an additive synchronizing torque $T_a$ which adds to the torque $T_o$ to provide a total torque $T_r$. FIG. 6 illustrates the position of the self-energizing ramp surfaces while shift flange 42 is in the neutral position corresponding to the position of FIG. 1. FIG. 7 illustrates a position of the ramps and splines while gear 16 is being synchronized by engaged cone surfaces 28a, 48a. The engaged cone surfaces are producing a synchronizing torque in a direction which has effected engagement of flange ramp surfaces 62a with shaft ramp surfaces 20a. Hence, the sum of the axial forces for engaging the cone clutch are $F_o$ plus $F_a$ and the sum of the synchronizing torques being produced by the cone clutch are $T_o$ plus $T_a$, as graphically shown in FIG. 8. For a given operator shift force $F_o$ and an operator synchronizing torque $T_o$, the magnitude of the axial additive force is preferably a function of the angle of the engaged self-energizing ramp surfaces. This angle is preferably great enough to produce an additive force $F_a$ of magnitude sufficient to significantly increase synchronizing torque and decrease synchronizing time in response to a given moderate shift effort by the operator. However, this angle is also preferably low enough to produce a controlled axial additive force $F_a$, i.e., the force $F_a$ should increase or decrease in response to the force $F_o$ increasing or decreasing. If the ramp angle is too great, the ramps are self-locking rather than self-energizing; hence, once initial engagement of the cone clutch is effected the force $F_a$ will rapidly and uncontrollably increase independent of the force $F_o$, thereby driving the cone clutch toward uncontrolled lockup. Self-locking rather than self-energizing decreases shift quality or shift feel, may over stress synchronizer components, may cause over heating and rapid wear of the cone clutch surfaces, and may even override operator movement of the shift lever.

The main variables and equations for calculating self-energizing ramp angles may be seen by reference to previously mentioned U.S. Pat. No. 5,092,439.

A preferred embodiment of a pin-type synchronizer has been disclosed. The following claims are intended to cover inventive portions of the disclosed sychronizer and variations and modifications believed to be within the spirit of the invention.

What is claimed is:

1. A pin-type synchronizer selectively operative to frictionally synchronize and positive connect either of first and second drives mounted for relative rotation about an axis of a shaft; the synchronizer including:

first and second jaw members affixed respectively to the first and second drives and respectively engagable with axially movable third and fourth jaw members positioned between the drives, the third and fourth jaw members having internal splines slidably mating for non-relative rotation with external splines affixed to the shaft;

first and second cone friction rings respectively secured for rotation with the first and second drives and third and fourth cone friction rings concentric to the shaft and axially movable between the drives for frictional engagement respectively with the first and second friction rings to provide a synchronizing torque for synchronizing the drives with the shaft;

a radially extending flange having axially oppositely facing sides positioned between the third and fourth jaw members and between the third and fourth friction rings for axially moving the jaw members and rings into said engagement in response to an axial bidirectional shift force ($F_o$) applied to the flange;

blocker means operative when engaged for preventing engagement of the jaw members prior to the synchronizing, the blocker means including a plurality of circumferentially spaced apart pins rigidly extending axially between the third and forth friction rings and into a first set of openings in the flange, each of the pins having a blocker shoulder engagable with a blocker shoulder defined about the associated opening;

first means securing the flange against axial movement relative to the third and fourth jaw members; the improvement comprising:

the first means including a plurality of circumferentially spaced apart retainers, each retainer having an axially extending portion disposed about a radially outward portion of the third and fourth jaw members and axially spaced apart and radially inwardly extending portions embracing axially oppositely facing portions of the third and fourth jaw members, and each axially extending portion having axially spaced apart and radially outwardly facing portions disposed in relatively close sliding rotation with radially inward portions of the third and fourth friction rings for limiting radially outward movement of the retainers.

2. The synchronizer of claim 1, wherein:

the third and fourth friction rings each include radially inwardly opening and circumferentially spaced apart recesses extending axially therethrough and slidably receiving the retainers for maintaining a circumferential spacing of the retainers.

3. The synchronizer of claim 2, wherein:

the third and fourth friction rings include at least twice as many of the radially inwardly opening recesses as retainers for allowing interchangeability of the rings with each other.

4. The synchronizer of claim 1, wherein;

the axial spacing between the retainer radially outwardly facing portions is sufficient to remain in sliding relation with the radially inward portions of the third and fourth friction rings when either the first and third or second and fourth jaw members are engaged.

5. The synchronizer of claim 4, wherein:

the first and second drives include axially extending recesses for receiving end portions of the retainers when the jaw members are engaged.

6. The synchronizer of claim 4, wherein:

the third and fourth friction rings each include radially inwardly opening and circumferentially spaced apart recesses extending axially therethrough and slidably receiving the retainers for maintaining a circumferential spacing of the retainers.

7. The synchronizer of claim 6, wherein:

the third and fourth friction rings include at least twice as many of the radially inwardly opening recesses as retainers for allowing interchangeability of the rings with each other.

8. The synchronizer of claim 6, wherein:

the first and second drives include axially extending recesses for receiving end portions of the retainers when the jaw members are engaged.

9. The synchronizer of claim 8, wherein:

the third and fourth friction rings include at least twice as many of the radially inwardly opening recesses as retainers for allowing interchangeability of the rings with each other.

* * * * *